United States Patent
Clemen

(10) Patent No.: US 10,591,162 B2
(45) Date of Patent: Mar. 17, 2020

(54) HEAT SHIELD FOR A GAS TURBINE COMBUSTION CHAMBER

(71) Applicant: Rolls-Royce Deutschland Ltd & Co KG, Blankenfelde-Mahlow (DE)

(72) Inventor: Carsten Clemen, Mittenwalde (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 419 days.

(21) Appl. No.: 14/539,236

(22) Filed: Nov. 12, 2014

(65) Prior Publication Data
US 2015/0128602 A1    May 14, 2015

(30) Foreign Application Priority Data
Nov. 14, 2013    (DE) .................. 10 2013 223 258

(51) Int. Cl.
| | | |
|---|---|---|
| F23R 3/00 | (2006.01) | |
| F23R 3/60 | (2006.01) | |

(Continued)

(52) U.S. Cl.
CPC ............ *F23R 3/002* (2013.01); *F16B 37/048* (2013.01); *F23R 3/60* (2013.01); *F16B 5/02* (2013.01);
(Continued)

(58) Field of Classification Search
CPC ...... F16B 37/048; F16B 11/006; F16B 35/06; F16B 411/82; F16B 411/107; F16B 411/402; F16B 37/061; F23R 3/60; F23R 2900/03041; F23R 2900/00017; F23R 3/002
See application file for complete search history.

(56) References Cited

U.S. PATENT DOCUMENTS 2,202,405 A * 5/1940 Smith ................ B23K 11/0046
219/107
3,242,113 A * 3/1966 Kell ........................ C09J 111/00
235/201 PF
(Continued)

FOREIGN PATENT DOCUMENTS

| DE | 10214570 | 1/2004 |
|---|---|---|
| EP | 0972992 | 1/2000 |
| EP | 2423596 | 2/2012 |

OTHER PUBLICATIONS

Turnkey Heating Solutions, "The Brazing Guide", Jun. 2010, pp. 2 and 7.*
(Continued)

*Primary Examiner* — Steven M Sutherland
*Assistant Examiner* — Thuyhang N Nguyen
(74) *Attorney, Agent, or Firm* — Shuttleworth & Ingersoll, PLC; Timothy J. Klima

(57) ABSTRACT

The present invention relates to a combustion chamber heat-shielding element of a gas-turbine, having a bolt for mounting the combustion chamber heat-shielding element on a combustion chamber wall or a combustion chamber head, where the combustion chamber heat-shielding element is designed substantially plate-like and where on one side at least one bolt, which is designed as a separate component, is anchored on it by means of a bonded connection.

8 Claims, 7 Drawing Sheets

Figure 1:
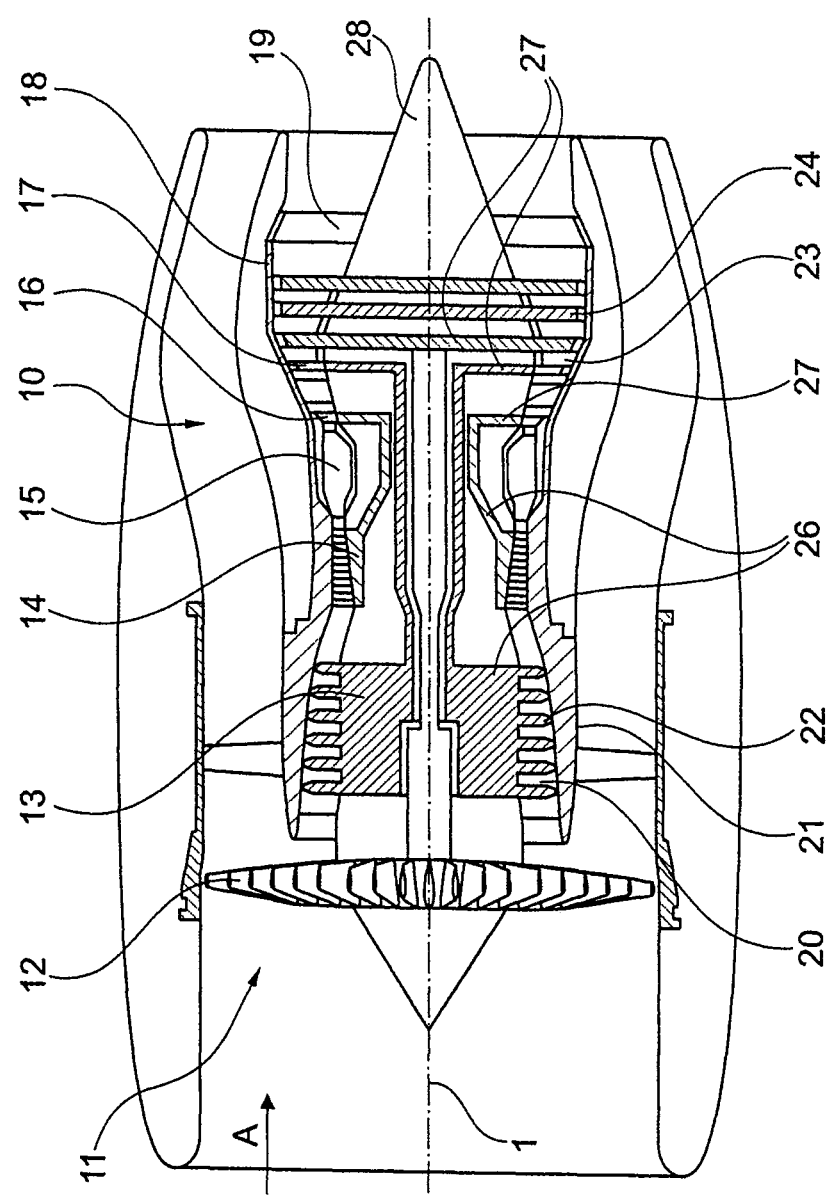

(51) Int. Cl.
  *F16B 37/04* (2006.01)
  *F16B 21/12* (2006.01)
  *F16B 11/00* (2006.01)
  *F16B 5/02* (2006.01)

(52) U.S. Cl.
  CPC ............ *F16B 11/006* (2013.01); *F16B 21/12* (2013.01); *F23R 2900/00017* (2013.01); *F23R 2900/03041* (2013.01)

(56) References Cited

U.S. PATENT DOCUMENTS

| | | | | |
|---|---|---|---|---|
| 3,435,871 | A * | 4/1969 | Johnson | B23K 11/14 219/107 |
| 4,349,313 | A * | 9/1982 | Munroe | F01D 11/125 415/173.4 |
| 4,944,151 | A | 7/1990 | Hovnanian | |
| 5,000,005 | A | 3/1991 | Kwan et al. | |
| 5,253,966 | A * | 10/1993 | Clemens | F02M 35/10072 249/165 |
| 5,578,227 | A * | 11/1996 | Rabinovich | B23K 26/34 156/180 |
| 5,837,960 | A * | 11/1998 | Lewis | B23K 26/34 219/121.63 |
| 5,984,369 | A * | 11/1999 | Crook | F02K 9/343 285/21.1 |
| 6,145,319 | A | 11/2000 | Burns et al. | |
| 7,059,133 | B2 | 6/2006 | Gerendas | |
| 7,393,488 | B2 | 7/2008 | Grose et al. | |
| 8,099,961 | B2 * | 1/2012 | Gerendas | F23R 3/002 60/752 |
| 8,413,929 | B2 * | 4/2013 | Kamino | B29C 65/562 244/1 A |
| 2007/0212193 | A1 * | 9/2007 | Wang | F16B 37/061 411/171 |
| 2008/0280130 | A1 * | 11/2008 | Beele | C23C 14/0036 428/332 |
| 2010/0095679 | A1 * | 4/2010 | Rudrapatna | F23R 3/005 60/752 |
| 2011/0030378 | A1 * | 2/2011 | Carlisle | F23R 3/002 60/753 |
| 2011/0314823 | A1 | 12/2011 | Smith et al. | |
| 2013/0117996 | A1 | 5/2013 | Ducornait et al. | |

OTHER PUBLICATIONS

European Search Report dated Apr. 7, 2015 for related European Patent Application No. 14192087.6.
German Search Report dated Mar. 20, 2014 from counterpart app No. 10 2013 223 258.8.

* cited by examiner

HEAT SHIELD FOR A GAS TURBINE COMBUSTION CHAMBER

This application claims priority to German Patent Application DE102013223258.6 filed Nov. 14, 2013, the entirety of which is incorporated by reference herein.

This invention relates to gas-turbine combustion chambers with combustion chamber tiles and/or heat shields, where the combustion chamber tiles or heat shields are fastened to a supporting structure of the combustion chamber outer walls or to the combustion chamber head, respectively.

The combustion chamber tiles have an arbitrary number (very high, often in the thousands) of effusion cooling holes on the side facing the combustion chamber. These effusion cooling holes are used to cool the tile against the high temperatures prevailing in the combustion chamber. Moreover, at least one mixing air hole can be located on the combustion chamber tile and is used to pass air from the space (annulus) surrounding the combustion chamber on the outside into the combustion chamber, for the purpose of cooling the combustion and making it lean, thereby reducing the amount of NOx generated. In addition to cooling by the effusion cooling holes, the tiles are frequently also provided with a ceramic coating acting as an insulating layer against the high temperatures in the combustion chamber.

The heat shields have an arbitrary (very high) number of effusion cooling holes on the side facing the combustion chamber. These holes are used to cool the heat shield against the high temperatures prevailing in the combustion chamber.

The fastening of the combustion chamber tile to the combustion chamber outer wall and of the heat shields to the combustion chamber head is according to the state of the art, for example by set screws forming an integral part of the tile/heat shield and having a thread. They are fixed using a nut to the combustion chamber outer wall or to the combustion chamber head respectively, through a hole in said combustion chamber outer wall and in said combustion chamber head.

The further explanations relate to the combustion chamber tile, the principle and the arrangement applying equally for heat shields.

This arrangement is known from the state of the art, cf. EP 972 992 B1, DE 102 14 570 A1 or U.S. Pat. No. 6,145,319A.

Figure 2:
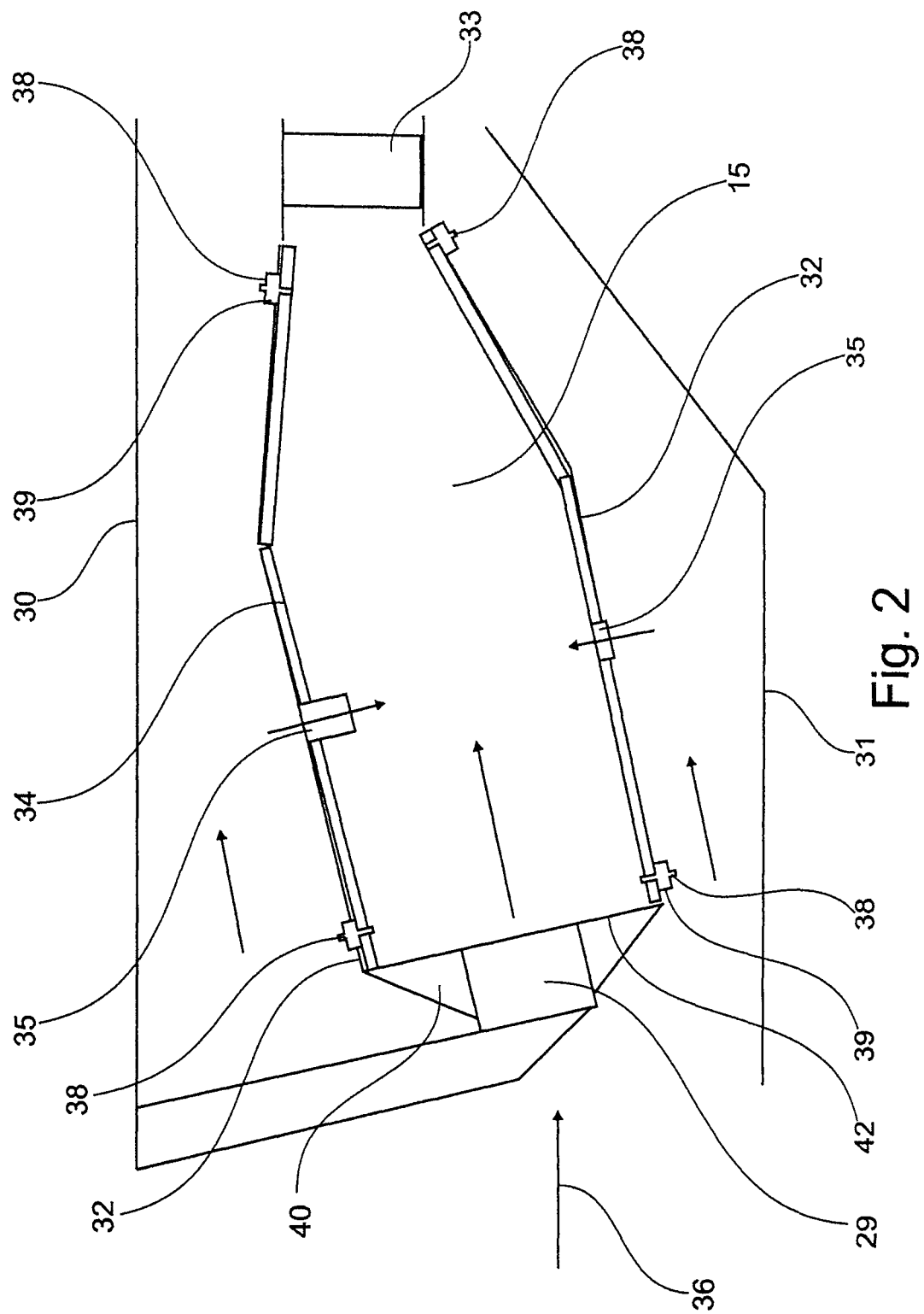

FIG. 2 shows schematically a combustion chamber 15. The combustion chamber 15 includes a fuel nozzle 29 which is mounted in the usual way on a combustion chamber head 40 provided with at least one heat shield 42. Furthermore, a combustion chamber outer casing 30 and a combustion chamber inner casing 31 are provided. A combustion chamber wall 32 encloses the combustion chamber 15 proper and supports combustion chamber tiles 34. The reference numeral 33 shows schematically a turbine inlet guide vane row. Air is supplied in the usual way through admixing holes 35. The inflow direction is indicated with the reference numeral 36.

Figure 3:
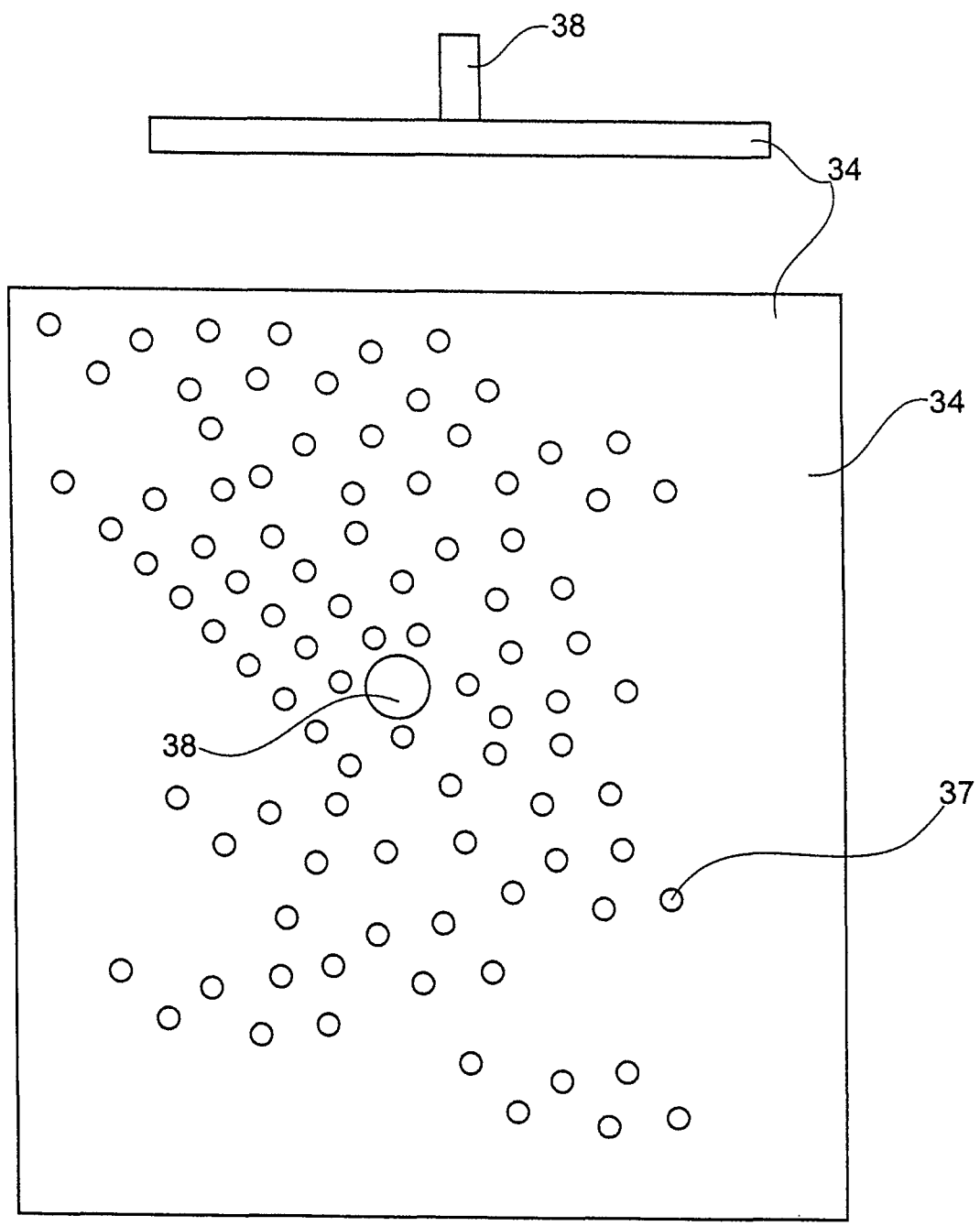

FIG. 3 shows a tile 34 with effusion cooling holes 37 according to the state of the art. The geometry (diameter, shape) of the admixing hole 35 can, as is known from the state of the art, be designed in a suitable way. The same applies for the size and arrangement of the effusion cooling holes 37. The admixing holes 35 are frequently designed as a funnel or tube projecting into the combustion chamber 15.

The tiles 34 are usually manufactured either by casting, coating with a ceramic layer and drilling of the effusion cooling holes 37 (e.g. with laser), by casting, drilling and coating, or by an additive manufacturing method such as selective laser sintering, direct laser depositioning or electron-beam build-up welding. With the additive methods, the effusion cooling holes 37 are made directly in the tile 34, and expensive drilling is not required.

During operation, there are recurring problems with so-called 'creep' of the material, which can lead to failure of the set screw and hence to loss of the tile.

Furthermore, the design of the tile with integrated set screw is only of limited suitability for additive manufacturing, such as selective laser sintering, direct laser depositioning or electron-beam build-up welding, since either cost-intensive horizontal manufacture has to be selected or an expensive sub-structure has to be provided for supporting the set screw. A sub-structure of this type has considerable disadvantages: a) it is material-intensive, b) it prolongs the manufacturing process, and c) it has to be removed from the tile after manufacture, which is very cost-intensive.

The object underlying the present invention is to provide a combustion chamber heat-shielding element, in particular a combustion chamber tile or a heat shield of a gas turbine and a fastening possibility for a combustion chamber of this type which while being simply designed and easily and cost-effectively producible avoid the disadvantages of the state of the art and ensure good fastenability.

It is a particular object to provide a solution to the above problem by a combination of features described herein. Further advantageous embodiments will become apparent from the present description.

In accordance with the invention, it is thus provided that the combustion chamber heat-shielding element is designed substantially plate-like and that on one side at least one bolt, which is designed as a separate component, is anchored on it by means of a bonded connection.

The embodiment provided in accordance with the invention on the one hand ensures secure fastening of the bolt to the combustion chamber heat-shielding element, and on the other hand achieves simple and cost-effective producibility.

The combustion chamber heat-shielding element is, in accordance with the invention, preferably designed in the form of a combustion chamber tile or in the form of a heat shield.

The combustion chamber heat-shielding element in accordance with the invention is thus designed such that a separate bolt, which in accordance with the invention can be a threaded bolt or a bolt that can be fastened with a locking element, is anchored on the combustion chamber heat-shielding element by means of a bonded connection. It is thus possible in accordance with the invention to produce the bolt from a different material to that of the combustion chamber heat-shielding element. Furthermore, it is possible to select a simple and cost-effective manufacturing method for the combustion chamber heat-shielding element, since the bolt can be made as a separate component. In particular, due to the possibility of using different materials for the combustion chamber heat-shielding element and the bolt, it is possible to solve the fastening problems known from the state of the art and to prevent or minimize creep of the bolt material.

It is particularly favourable in accordance with the invention when the combustion chamber heat-shielding element is provided with a receptacle for the bolt. Said receptacle can for example be in the form of a raised bearing arrangement or the like and is preferably designed in particular such that a precisely and/or positively fitting reception of the bolt inside a recess of the receptacle is possible in order to permit subsequent bonding of the bolt when the latter is in the correct position.

It is furthermore particularly advantageous for cooling when the combustion chamber heat-shielding element and in particular the receptacle are provided with effusion cooling holes.

The bolt in accordance with the invention can be designed such that it is provided only over part of its length with a thread, so that the end area to be bonded to the receptacle is designed without a thread. This end area can be contoured as required to match the contouring of the recess in the receptacle, for example round, polygonal, oval, angled or flattened. The receptacle can be designed in the same way.

Furthermore, it is possible in accordance with the invention to design the outer contour of the receptacle fastened to the combustion chamber heat-shielding element to have favourable flow characteristics, for example by providing it with chamfered flanks. Effusion cooling holes can also be provided in the receptacle in accordance with the invention in order to ensure cooling of the combustion chamber heat-shielding element.

The bolt in accordance with the invention is inserted in the usual way through a hole in the combustion chamber outer wall, so that the fastening proper of the bolt does not differ substantially from the state of the art. It is thus possible with a threaded bolt to screw on a nut in the usual way.

The embodiment in accordance with the invention also permits supporting of the combustion chamber heat-shielding element to keep it clear of the combustion chamber wall, or in an alternative embodiment to have the combustion chamber heat-shielding element directly contacting the combustion chamber wall or the combustion chamber head. Differing cooling concepts can therefore be designed, as is also known from the state of the art.

In accordance with the invention, the bonded connection is achieved preferably by means of a high-temperature resistant metal adhesive permitting temperatures of 1000° C. or higher. Alternatively, it is also possible to connect the bolt, additionally to the bonded connection which can then if required act only as a temporary bonded connection for assembly purposes, by means of a further joining method, for example by welding, brazing, clamping or the like, to the combustion chamber heat-shielding element.

Figure 4:
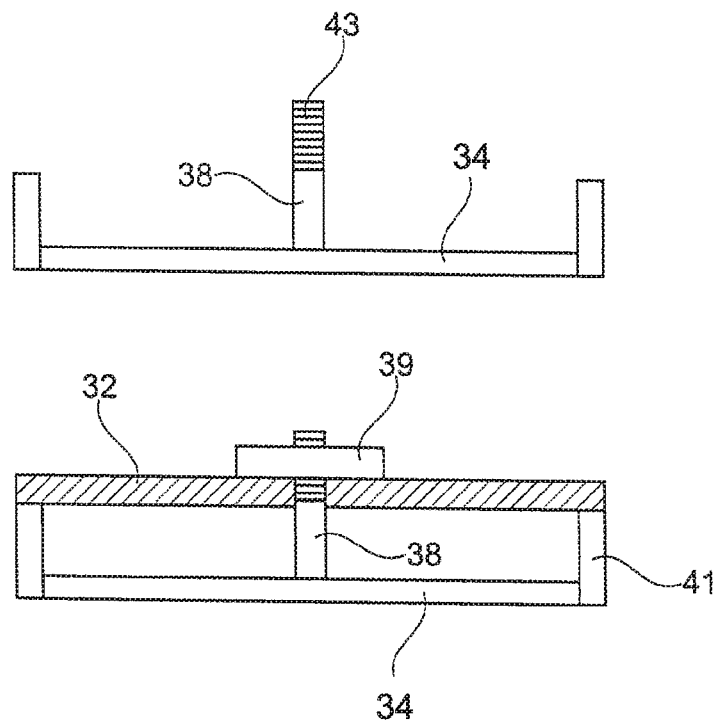
Figure 5:
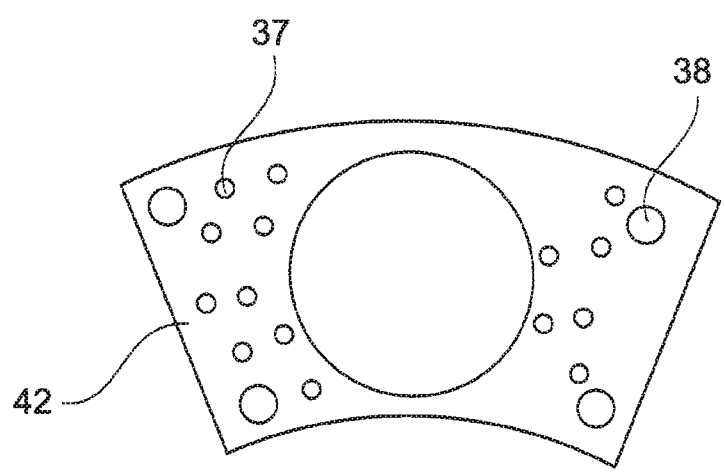
Figure 6:
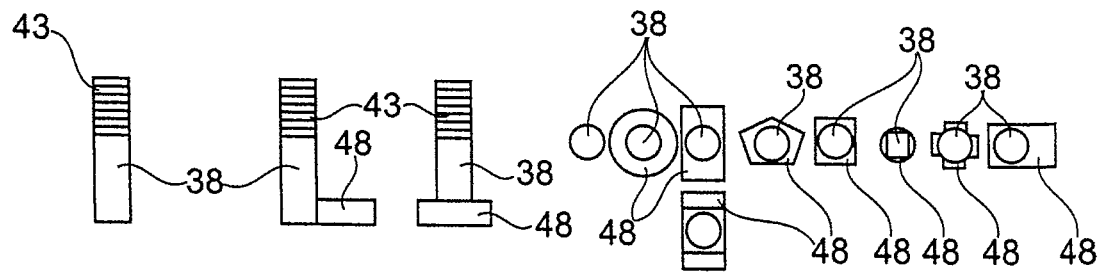
Figure 7:
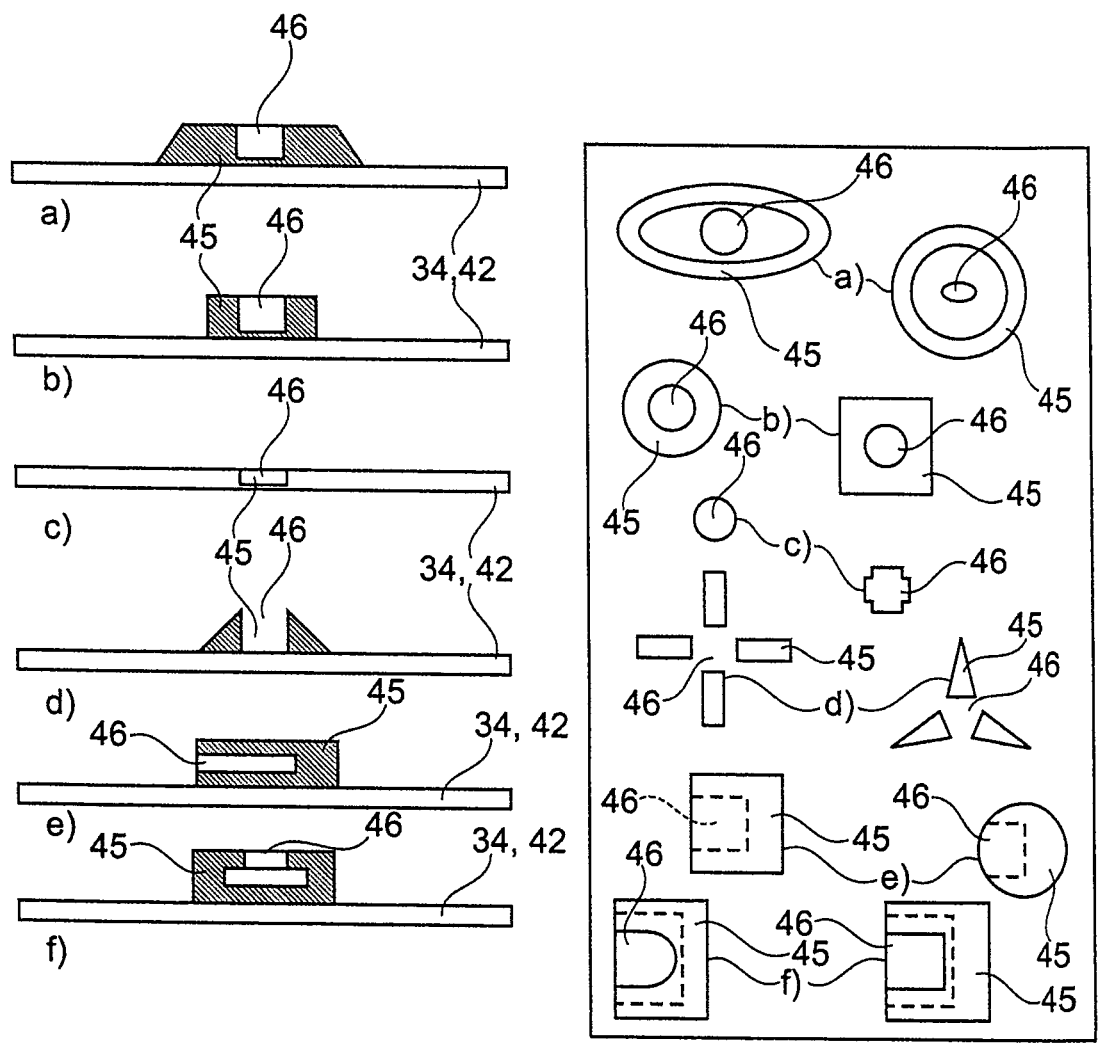
Figure 8:
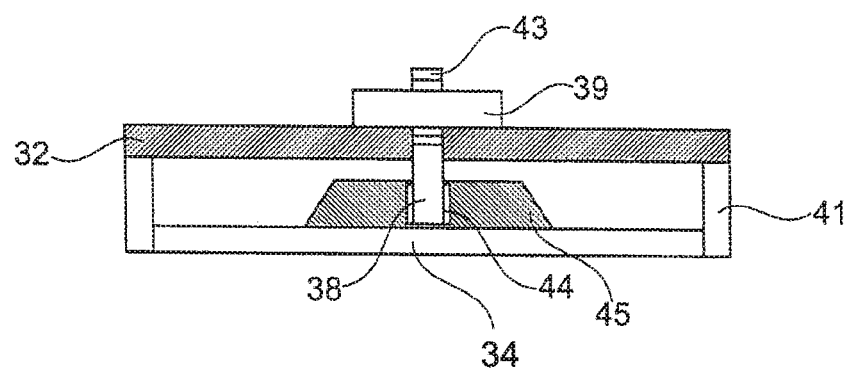
Figure 9:
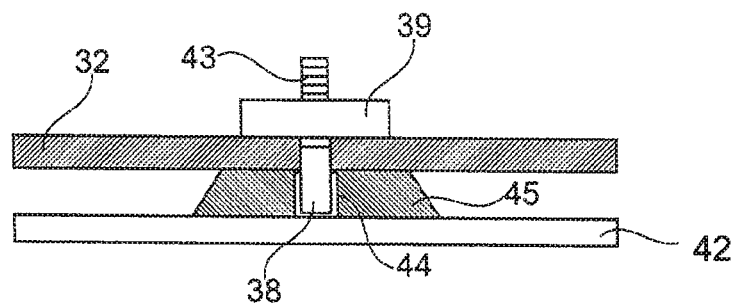
Figure 10:
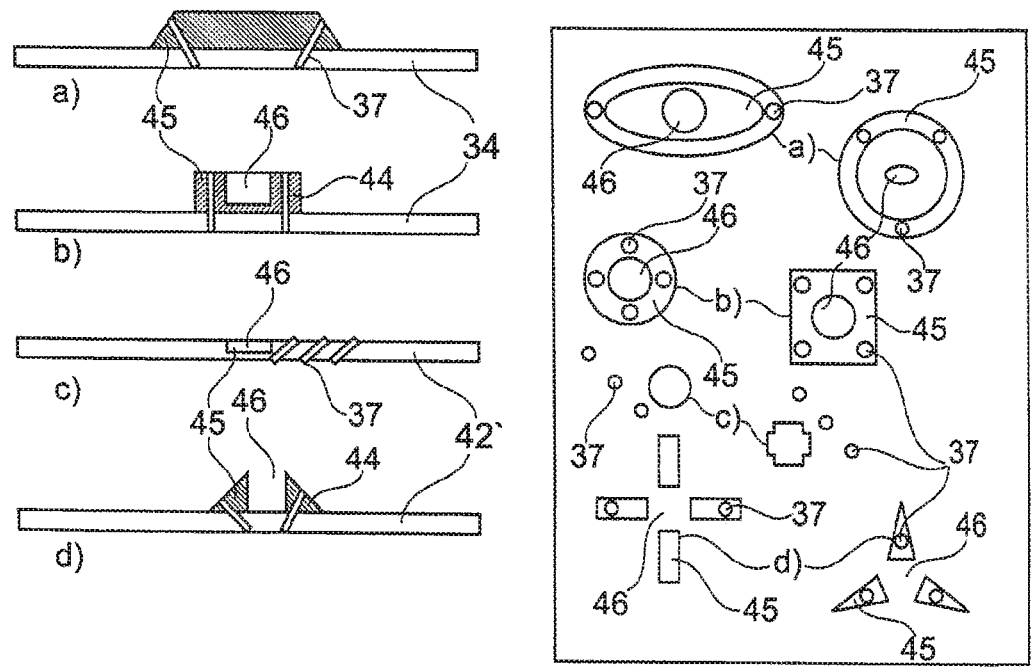
Figure 11:
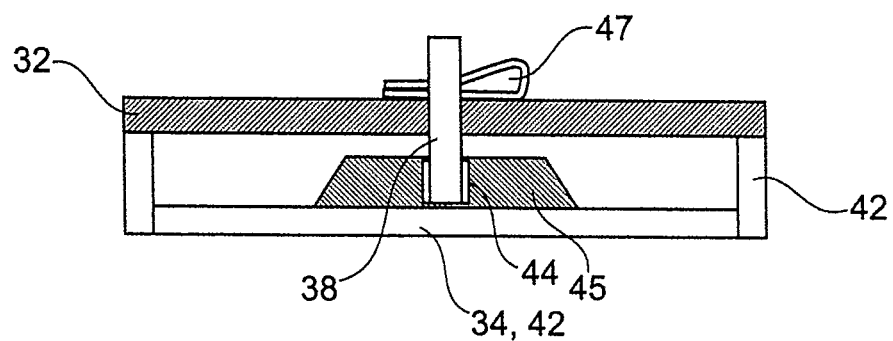
Figure 12:
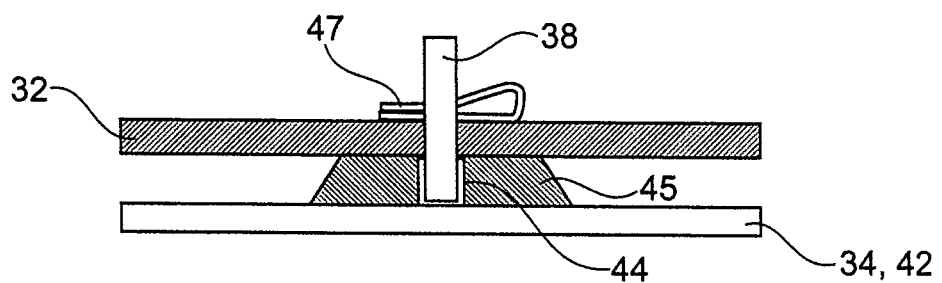

The present invention is described in the following in light of the accompanying drawing, showing exemplary embodiments. In the drawing, FIG. 1 shows a schematic representation of a gas-turbine engine in accordance with the present invention, FIG. 2 shows a schematic (sectional) side view of a combustion chamber in accordance with the state of the art, FIG. 3 shows a top view and a side view of a combustion chamber tile known from the state of the art, FIG. 4 shows a sectional side view of a fastening possibility of a combustion chamber tile relative to the combustion chamber outer wall in accordance with the state of the art, FIG. 5 shows a simplified view of a heat shield for being used in the present invention with bolts and effusion cooling holes, FIG. 6 shows schematic side views and top views of differing embodiments of the bolt in accordance with the present invention, FIG. 7 shows side views and top views of differing embodiments of the combustion chamber heat-shielding element with receptacles in accordance with the present invention, FIG. 8 shows a representation of an exemplary embodiment with combustion chamber heat-shielding element and support towards the combustion chamber wall, FIG. 9 shows a view, by analogy with FIG. 8, with direct contact of the support on the combustion chamber wall, FIG. 10 shows schematic side views and top views of exemplary embodiments with effusion cooling holes, and FIGS. 11 and 12 show simplified side views, by analogy with FIGS. 8 and 9, with the bolt being secured by means of a locking pin.

The gas-turbine engine 10 in accordance with FIG. 1 is an example of a turbomachine where the invention can be used. The following however makes clear that the invention can also be used in other turbomachines. The engine 10 is of conventional design and includes in the flow direction, one behind the other, an air inlet 11, a fan 12 rotating inside a casing, an intermediate-pressure compressor 13, a high-pressure compressor 14, combustion chambers 15, a high-pressure turbine 16, an intermediate-pressure turbine 17 and a low-pressure turbine 18 as well as an exhaust nozzle 19, all of which being arranged about a center engine axis 1.

The intermediate-pressure compressor 13 and the high-pressure compressor 14 each include several stages, of which each has an arrangement extending in the circumferential direction of fixed and stationary guide vanes 20, generally referred to as stator vanes and projecting radially inwards from the engine casing 21 in an annular flow duct through the compressors 13, 14. The compressors furthermore have an arrangement of compressor rotor blades 22 which project radially outwards from a rotatable drum or disk 26 linked to hubs 27 of the high-pressure turbine 16 or the intermediate-pressure turbine 17, respectively.

The turbine sections 16, 17, 18 have similar stages, including an arrangement of fixed stator vanes 23 projecting radially inwards from the casing 21 into the annular flow duct through the turbines 16, 17, 18, and a subsequent arrangement of turbine blades 24 projecting outwards from a rotatable hub 27. The compressor drum or compressor disk 26 and the blades 22 arranged thereon, as well as the turbine rotor hub 27 and the turbine rotor blades 24 arranged thereon rotate about the engine axis 1 during operation.

FIG. 4 shows various side views according to the state of the art, illustrating a support 41 of the combustion chamber tile 34 relative to the combustion chamber wall 32. FIG. 5 shows a heat shield 42 according to the state of the art with bolts 38 and effusion cooling holes 37.

FIG. 5 shows a heat shield according to the state of the art with bolts 38 and effusion cooling holes 37 and also with a centric recess for a fuel nozzle (see FIG. 2).

FIG. 6 shows in the three left-hand representations schematic side views of exemplary embodiments of the bolt 38 in accordance with the invention. The right-hand half of FIG. 6 shows differing top views onto the bolt 38. Here, in particular, it can be seen that the bolt 38 can have a contoured base 48 which can be designed in a wide variety of forms, i.e. as a round flange, with rectangular projections, in polygonal form or in another embodiment.

FIG. 7 shows in the left-hand half, in a schematic representation, simplified sectional views of exemplary embodiments of the combustion chamber heat-shielding element 34, 42 in accordance with the invention, and also of the receptacle 45 fastened thereon. The latter is provided with a recess 46 into which a contoured base 48 of the bolt 38 can be inserted and bonded. Like the combustion chamber heat-shielding element 34, 42, the receptacle 45 with the recess 46 can be manufactured in one piece with the combustion chamber heat-shielding element, for example by means of an additive manufacturing method, see above.

The right-hand half of FIG. 7 shows in each case top views onto differing embodiments of the receptacle 45 or the associated recess 46. The lower-case letters a to f correspond here in each case to the side views and top views, respectively.

FIGS. 8 and 9 show differing exemplary embodiments in accordance with the invention. According to FIG. 8, the combustion chamber heat-shielding element 34, 42 is kept at a distance from the combustion chamber wand 32 by means of supports 41. This creates a space between the receptacle 45 and the combustion chamber wall 32. In the exemplary embodiment of FIG. 9, the receptacle 45 is in direct contact with the combustion chamber wall 32.

The reference numeral 44 shows in each case the bonded connection for anchoring the bolt 38 at the receptacle 45.

FIG. 10 shows exemplary embodiments of effusion cooling holes 37 which in particular are designed adjacent to the receptacle 45 or provided directly inside the receptacle 45. The left-hand representations of FIG. 10 each show simplified sectional side views, while the right-hand half of FIG. 10 shows associated top views, as identified by the lower-case letters a to d.

FIGS. 11 and 12 show a further design variant, by analogy with FIGS. 8 and 9, where the bolt 38 is not provided with a thread, but is held by means of a locking pin 47.

LIST OF REFERENCE NUMERALS

1 Engine axis
10 Gas-turbine engine
11 Air inlet
12 Fan rotating inside the casing
13 Intermediate-pressure compressor
14 High-pressure compressor
15 Combustion chamber
16 High-pressure turbine
17 Intermediate-pressure turbine
18 Low-pressure turbine
19 Exhaust nozzle
20 Guide vanes
21 Engine casing
22 Compressor rotor blades
23 Stator vanes
24 Turbine blades
26 Compressor drum or disk
27 Turbine rotor hub
28 Exhaust cone
29 Fuel nozzle
30 Combustion chamber outer casing
31 Combustion chamber inner casing
32 Combustion chamber wall
33 Turbine inlet guide vane row
34 Combustion chamber tile
35 Admixing hole
36 Inflow direction
37 Effusion cooling hole
38 Bolt
39 Nut
40 Combustion chamber head
41 Support
42 Heat shield
43 Thread
44 Bonded connection
45 Receptacle
46 Recess
47 Locking pin
48 Base

What is claimed is:

1. A combustion chamber heat-shielding arrangement of a gas-turbine, comprising:
a combustion chamber heat-shielding element having a plate shape,
a bolt for mounting the combustion chamber heat-shielding element on a combustion chamber wall or a combustion chamber head, the bolt configured as a separate component from the combustion chamber heat-shielding element, the bolt having a first end having a non-cylindrical contoured base for anchoring to the combustion chamber heat-shielding element,
a receptacle provided on the combustion chamber heat-shielding element, the receptacle including a non-cylindrical recess shaped for receiving the non-cylindrical contoured base of the first end of the bolt in a form fitting and rotational preventing locking manner,
an adhesive bonded connection connecting the first end of the bolt to the non-cylindrical recess, the adhesive bonded connection consisting of the first end of the bolt, the non-cylindrical recess and an adhesive positioned between and connecting the first end of the bolt to the non-cylindrical recess, wherein the adhesive consists of a high-temperature resistant metal adhesive resistant to temperatures of at least 1000° C.,
wherein the receptacle includes effusion cooling holes.

2. The combustion chamber heat-shielding arrangement in accordance with claim 1, wherein the first end of the bolt is unthreaded.

3. The combustion chamber heat-shielding arrangement in accordance with claim 2, wherein the receptacle is one piece with the combustion chamber heat-shielding element.

4. The combustion chamber heat-shielding arrangement in accordance with claim 3, wherein the combustion chamber heat-shielding element is manufactured by an additive manufacturing method.

5. The combustion chamber heat-shielding arrangement in accordance with claim 2, wherein the combustion chamber heat-shielding element is at least one chosen from a combustion chamber tile and a heat shield.

6. The combustion chamber heat-shielding arrangement in accordance with claim 1, wherein the receptacle is one piece with the combustion chamber heat-shielding element.

7. The combustion chamber heat-shielding arrangement in accordance with claim 1, wherein the combustion chamber heat-shielding element is manufactured by an additive manufacturing method.

8. The combustion chamber heat-shielding arrangement in accordance with claim 1, wherein the combustion chamber heat-shielding element is at least one chosen from a combustion chamber tile and a heat shield.

* * * * *